United States Patent Office 3,262,986
Patented July 26, 1966

3,262,986
VULCANIZATION OF SATURATED POLYMERS WITH FURFURAL OR FURFURAL CONDENSATES
Roelf J. Kuipers, Delft, Netherlands, assignor to Stamicarbon N.V., Heerlen, Netherlands
No Drawing. Filed May 7, 1962, Ser. No. 192,987
Claims priority, application Netherlands, May 5, 1961, 264,475; Aug. 30, 1961, 268,788
14 Claims. (Cl. 260—828)

The present invention relates to a process for the vulcanization of substantially saturated polymers, by which is to be understood the cross-linking of homopolymers or copolymers of ethylene, propylene, butylene-1, isobutylene, styrene, acrylonitrile, vinyl acetate and such-like, or derivatives of these polymers, which polymers have for instance been prepared with the aid of Ziegler catalysts and contain only so few double bonds that they cannot be vulcanized with sulphur only. The invention particularly relates to the vulcanization of copolymers of ethylene with propylene and/or butylene-1 which have been prepared with the aid of Ziegler catalysts.

According to the United States patent specification No. 2,710,291 it was found in 1952 that a saturated polymer, namely polyisobutylene, can be vulcanized with the aid of means known in the art of vulcanizing unsaturated polymers, such as rubbers, that is to say with the aid of an organic peroxide and sulphur.

Another method of vulcanizing saturated polymers is known from the British patent specification No. 608,333, according to which an ethylene polymer is vulcanized by heating it at 100 to 250° C. in the presence of an inorganic peroxide and a saturated organic acid, such as stearic acid, or an unsaturated acid, such as i.a. oleic acid, or a dicarboxylic acid, such as suberic acid.

From the French patent specification No. 1,200,144 it is known that saturated polymers can also be vulcanized with a source of free radicals, such as a peroxide and an unsaturated acid. By preference, maleic acid is used as unsaturated acid, as by far the best tensile strength can be obtained with the aid of this acid (see Tables 2 and 3). The source of free radicals almost invariably used is benzoyl peroxide. It is furthermore preferred to add a substance capable of forming so-called salt bridges between the polymer chains, such as a glycol, a diamine, or a metallic oxide, preferably zinc oxide. Addition of the last-mentioned substance has a particularly strong effect, since, as appears from Table 8, addition of 5% by weight of ZnO increases the tensile strength from 38 to 100 kg. per cm.$^2$. It is believed that the zinc oxide forms salt bridges with the maleic anhydride groups grafted upon the polymer chain.

Consequently, the vulcanization according to the above-mentioned French Patent No. 1,200,144 is preferably carried out in two steps:

(a) Heating of the polymer, the peroxide, and the maleic acid, if desired in solution, at a temperature, mostly 160° C., at which the peroxide decomposes, preferably completely, and a graft polymer is formed.

(b) Heating of the graft polymer, also at about 160° C., together with ZnO and/or a filler, such as carbon black and/or an antioxidant.

If, for instance, carbon black is used, it is considered an advantage that the carbon black is not capable of disturbing the decomposition of the peroxide, as it is not present during that decomposition (see page 7, 1st column, 3rd paragraph and following). In the examples in which carbon black is added, namely the Examples 15, 17 and 19, this addition does not take place until in the second step.

The present invention aims at providing a process by which vulcanized products which possess good mechanical properties can be obtained. The present invention also aims at providing a process by which the vulcanization with a filler, such as carbon black, can be carried out in one step, while, moreover, the addition of substances which must form salt bridges can be omitted.

The process according to the present invention for the vulcanization of substantially saturated polymers, in which the polymer is heated at 90–250° C. together with a source of free radicals, is characterized in that furfural and/or a condensation product of furfural is present during the heating. By preference, a filler is also present during the heating.

The amount of the furfural and/or the condensation product thereof may be varied within wide limits. Upon addition of 0.1% by weight of these substances with respect to the polymer the tensile strength already shows a distinct increase, whereas addition of more than 15% by weight decreases the tensile strength again. By preference, 0.5 to 5% by weight with respect to the polymer are added, as in that case products are obtained which show both a high tensile strength and a small permanent deformation after elongation.

The use of a condensation product of furfural instead of furfural itself has the advantage that the condensation product evaporates less readily than furfural, which may be advantageous in some cases. Moreover, in some cases the condensation product is more readily miscible with the condensation product than with furfural.

By condensation product is to be understood a product that is solid or semi-solid at room temperature and has been obtained by allowing furfural to react with substances as for example phenols, ketones or substances showing a basic reaction especially nitrogen containing substances, such as urea, melamine, guanidine, aliphatic or aromatic amines or ammonia.

The condensation is preferably carried out with a ketone, such as methylethylketone or with ammonia, because then the reaction proceeds very smoothly, the starting products are cheap and the mechanical properties of the vulcanizates obtained with these condensation products are attractive. Condensation products obtained with phenols or amines, on the other hand surprisingly have the advantage of rendering the vulcanized product more resistant to oxidation.

Well-known sources of free radicals are inorganic peroxides, organic azo-compounds, and organic peroxy-compounds, such as hydroperoxides, dialkylperoxides, diaralkylperoxides, peroxy-acids, peroxy-esters, diacylperoxides, diaroylperoxides and peroxy-derivatives of aldehydes and ketones. Dialkylperoxides, diaralkylperoxides, and alkyl-aralkylperoxides, such as dicumylperoxide, ditertiary butylperoxide, tetrachlorditertiary butylperoxide, tertiary butyl-cumylperoxide, and 2,5-bistertiary butylperoxy-2,5 dimethylhexane are preferably used.

The amount of peroxide may be varied within wide limits. The best results are obtained if 0.5–6% weight of the peroxide with respect to the polymer are used.

Depending on the decomposition rate of the source of free radicals, the vulcanization temperature will preferably be taken, between 120 and 210° C. With dicumylperoxide, for instance, very good results are obtained if the vulcanization is carried out for 5 to 60 minutes at 150 to 170° C.

The known fillers for strengthening natural rubber and synthetic rubbers, such as carbon black, silicon oxides, calcium carbonate, calcium silicate, aluminum silicate, or colloidal clay, may be used as filler material. Very good results are obtained with soot, especially with the fine-grained soot grades used in the rubber industry. In addition, other customary auxiliary materials may be added, such as sulphur, stearic acid, metal salts, such as zinc naphthenate, softeners, such as mineral oils, factice or tar oil and/or anti-oxidants and/or dyes and/or odorants. If desired, a small amount of sorbic acid may also be added.

In the case of the polymers recovered in the form of solutions, such as the copolymers of ethylene with propylene prepared with the aid of a Ziegler catalyst, it may be advantageous to add the furfural and/or the condensation product and, if desired, also the source of free radicals and/or the filler to the solution. Then, upon evaporation of the solvent, a polymer is obtained in which the substances added are present in a finely-divided state. When using thermoplastic polymers, such as high-pressure polyethylene, these substances will normally be mixed with the molten polymer.

The following examples serve to elucidate the invention without, however, restricting it. Unless otherwise stated, the term parts should be taken to mean parts by weight. The stiffness, the tensile strength, the elongation at rupture, the tearing strength, and the permanent deformation were determined in accordance with the Dutch standard specification NEN 3,199. The permanent deformation is measured 60 minutes after the product has been subjected to an elongation of 200% during 24 hours.

EXAMPLE 1

100 parts of an amorphous ethylene-propylene copolymer with an inherent viscosity of 2.7 (measured on a solution of 0.1 g. of copolymer per 100 ml. of Decalin at 135° C.) were mixed on the mill at about 80° C. with:

50 parts of soot ("high abrasion furnace"),
5 parts of a 40% dicumylperoxide product (trademark "Perkadox BC–40"), and
0 to 10 parts of furfural.

Plaques of 120 by 120 by 2 mm., made of the resulting mixture, were vulcanized in a press for 30 minutes at a temperature of 160° C.

The mechanical properties are given in Table 1.

If, in contrast to the process according to the invention, the same experiment is carried out in the absence of soot, a product is obtained with a tensile strength of only about 25 kg./cm.$^2$.

*Table 1*

| Furfural (percent by weight) | 0 | 0.5 | 1 | 2 | 4 | 10 |
|---|---|---|---|---|---|---|
| Stress at 300% elongation (kg./cm.$^2$) | 31 | 51 | 49 | 40 | 35 | 18 |
| Tensile strength (kg./cm.$^2$) | 57 | 114 | 132 | 121 | 119 | 71 |
| Elongation at rupture (percent) | 580 | 540 | 610 | 650 | 710 | 840 |
| Tear strength (kg./cm.$^2$) | 29 | 53 | 65 | 67 | 62 | 40 |
| Permanent deformation (percent) | 35 | 22 | 28 | 25 | 26 | 38 |

A remarkable aspect of the process according to the invention is that, in spite of the relatively high volatility of the furfural very small amounts of this substance, for instance, 0.5 to 1% by weight with respect to the polymer, are sufficient to yield a product with good mechanical properties. These are equal to or of the same order as those of a product made in the same way from the same starting material with 0.5% of sulphur instead of furfural.

EXAMPLE 2

100 parts of an amorphous ethylene-propylene copolymer with an inherent viscosity of 6.8 (measured on a solution of 0.1 g. of copolymer per 100 ml. of Decalin at 135° C.) were mixed on the mill at about 80° C. with:

50 parts of soot ("high abrasion furnace"),
5 parts of a 40% dicumylperoxide product (trademark "Perkadox BC–40"), and
0 to 10 parts of furfural.

Plaques of 120 by 120 by 2 mm., made of the resulting mixture, were vulcanized in a press for 30 minutes at a temperature of 160° C.

The mechanical properties are given in Table 2.

*Table 2*

| Furfural (percent by weight) | 0 | 1 | 2 | 4 | 10 |
|---|---|---|---|---|---|
| Stress at 300% elongation (kg./cm.$^2$) | 54 | 57 | 67 | 71 | 45 |
| Tensile strength (kg./cm.$^2$) | 93 | 140 | 145 | 120 | 115 |
| Elongation at rupture (percent) | 420 | 460 | 440 | 420 | 540 |
| Permanent deformation (percent) | 21 | 12 | 12 | 15 | 18 |

EXAMPLE 3

At about 80° C., 100 parts of an amorphous ethylene-propylene copolymer with an inherent viscosity of 2.7 (measured on a solution of 0.1 g. of copolymer per 100 ml. of Decalin at 135° C.) were mixed on the roller with:

50 parts of soot ("high abrasion furnace"),
5 to 11 parts of a 40% dicumylperoxide product (trade mark "Perkadox BC–40"), and
0 to 7 parts of a condensation product of furfural obtained with the aid of methyl ethyl ketone.

Plaques of 120 x 120 x 2 mm., made of the resulting mixture, were vulcanized in a press for 30 minutes at a temperature of 160° C.

The mechanical properties are given in Table 3.

*Table 3*

| | | | | | | |
|---|---|---|---|---|---|---|
| 40% Dicumylperoxide (percent by weight) | 5 | 5 | 5 | 7 | 9 | 11 |
| Condensation product (percent by weight) | 0 | 3 | 5 | 2 | 5 | 7 |
| Stress at 300% elongation (kg./cm.$^2$) | 37 | 130 | 41 | 110 | 135 | 150 |
| Tensile strength (kg./cm.$^2$) | 63 | 145 | 135 | 140 | 145 | 150 |
| Elongation at rupture (percent) | 560 | 320 | 680 | 360 | 310 | 300 |
| Tear resistance (kg./cm.$^2$) | 33 | 31 | 68 | 30 | 33 | 35 |
| Permanent deformation (percent) | 35 | 16 | 14 | 8 | 7 | 9 |

The condensation product used was prepared by combining 20 g. of furfural, 4 g. of methylethylketone, and 10 g. of a 50 percent by weight solution of NaOH in water, as a result of which a dark brown, gummy product was formed with simultaneous evolution of heat, which product was neutralized with diluted acid, washed out with water, and dried at 100° C.

EXAMPLE 4

The experiment described in Example 3 was repeated, with the difference that in this case a dark colored resin was used as condensation product, which resin had been obtained by heating 20 g. of phenol together with 15 g. of furfural and 2 g. of sodium carbonate for about 3 hours at approximately 150° C. under reflux, and washing the product formed several times with warm water.

The results are shown in Table 4.

*Table 4*

| | | |
|---|---|---|
| Dicumylperoxide 40% (percent by weight) | 5 | 10 |
| Condensation product (percent by weight) | | 2 |
| Stress at 300% elongation (kg./cm.$^2$) | 37 | 70 |
| Tensile strength (kg./cm.$^2$) | 63 | 117 |
| Elongation at rupture (percent) | 560 | 440 |
| Tear resistance (kg./cm.$^2$) | 33 | 37 |
| Permanent deformation (percent) | 35 | 17 |

EXAMPLE 5

The experiment described in Example 3 was repeated, with the difference that in this case a dark colored product obtained by combining 10 g. of furfural and 5 g. of paraphenylenediamine, was used as condensation product. The results are given in Table 5.

Table 5

| | | | | |
|---|---|---|---|---|
| 40% Dicumylperoxide (percent by weight) | 10 | 10 | 10 | 10 |
| Condensation product (percent by weight) | 0 | 2 | 3 | 4 |
| Stress at 300% elongation (kg./cm.$^2$) | | 160 | 127 | 139 |
| Tensile strength (kg./cm.$^2$) | 73 | 160 | 174 | 161 |
| Elongation at rupture (percent) | 280 | 300 | 380 | 340 |

The products obtained in the Examples 4 and 5, cut up into small pieces (2 x 2 x 2 mm.), were subjected to an oxygen absorption measurement in an apparatus as described by Du Fraisse van Amerongen in Rev. Gén. du Caoutch., 1947, 18, 185. It was found that the two products have a better resistance to oxidation than polymers vulcanized with sulphur instead of with the condensation product.

EXAMPLE 6

The experiment described in Example 3 was repeated, with the difference that in this case the condensation product used was obtained by mixing 10 g. of furfural with 6 g. of hexamethylenediamine, allowing the mixture to boil, and after that heating it at approximately 100° C. for about one hour.

The results are shown in Table 6.

Table 6

| | | | | |
|---|---|---|---|---|
| 40% Dicumylperoxide (percent by weight) | 10 | 10 | 10 | 10 |
| Condensation product (percent by weight) | 0 | 2 | 3 | 4 |
| Stress at 300% elongation (kg./cm.$^2$) | | | 119 | 125 |
| Tensile strength (kg./cm.$^2$) | 73 | 130 | 159 | 156 |
| Elongation at rupture (percent) | 280 | 240 | 370 | 340 |

EXAMPLE 7

The experiment described in Example 3 was repeated, with the difference that in this case a dark-colored resin obtained by heating 20 g. of furfural under reflux together with 20 g. of aniline for 3 hours at about 170° C., was used as condensation product.

The results are given in Table 7.

Table 7

| | | |
|---|---|---|
| 40% Dicumylperoxide (percent by weight) | 5 | 5 |
| Condensation product (percent by weight) | | 1 |
| Stress at 300% elongation (kg./cm.$^2$) | 37 | 50 |
| Tensile strength (kg./cm.$^2$) | 63 | 109 |
| Elongation at rupture (percent) | 560 | 590 |
| Tear resistance (kg./cm.$^2$) | 33 | 46 |
| Permanent deformation (percent) | 35 | 19 |

EXAMPLE 8

The experiment described in Example 3 was repeated, with the difference, however, that in this case the condensation product used was hydrofuramide obtained by allowing 20 g. of furfural together with 100 ml. of a NH$_4$OH-solution (13 N) to stand for 3 hours, and after that filtering off the precipitate and recrystallizing it from alcohol.

The results are shown in Table 8.

Table 8

| | | | | | | | |
|---|---|---|---|---|---|---|---|
| Dicumylperoxide 40% (percent by weight) | 5 | 7 | 7 | 9 | 9 | 11 | 11 |
| Condensation product (percent by weight) | 0 | 2 | 6 | 3 | 7 | 4 | 7 |
| Stress at 300% elongation (kg./cm.$^2$) | 37 | 68 | 29 | 79 | 35 | 98 | 46 |
| Tensile strength (kg./cm.$^2$) | 63 | 140 | 115 | 145 | 125 | 165 | 155 |
| Elongation at rupture (percent) | 560 | 510 | 850 | 470 | 790 | 460 | 720 |
| Tear resistance (kg./cm.$^2$) | 33 | 46 | 61 | 48 | 79 | 45 | 68 |
| Permanent deformation (percent) | 35 | 18 | 29 | 14 | 26 | 15 | 21 |

From Table 8 it appears that the stress at 300% elongation is higher and the permanent deformation is lower in those cases where a smaller amount by weight of hydrofuramide with respect to the 40% peroxide was used. The best results are obtained when the amounts of peroxide and hydrofuramide are approximately equimolecular.

It appeared that the vulcanization can also be carried out with condensation products of furfural with urea, melamine or guanidine.

The condensation product of furfural with urea was obtained by heating 15 g. of the former and 10.5 g. of the latter at 150° C. for 2 hours and subsequently thoroughly washing and drying it.

The condensation product of furfural with melamine was prepared by heating 12 g. of the former and 15 g. of the latter at 150° C. for 1 hr. and subsequently thoroughly washing the resulting solid with hot water.

The condensation product of furfural with guanidine was prepared by boiling 15 g. of the former and 10.5 g. of the latter at 170° C. for 6 hours and extracting the resulting solid with hot water.

I claim:
1. A process for the vulcanization of a substantially saturated polymer formed of monomers having only one vinyl double bond comprising heating a mixture of said polymer at 90 to 250° C. together with a compound providing a source of free radicals and an amount of 0.1 to 15% by weight with respect to the polymer of a material selected from the group consisting of furfural and a condensation product of furfural.

2. A process according to claim 1, wherein said mixture also comprises a filler.

3. A process according to claim 1 wherein the material is used in an amount of 0.5 to 5% by weight with respect to the polymer.

4. A process according to claim 1 wherein said compound providing a source of free radicals is selected from the group consisting of a dialkyl, a diaralkylperoxide and an alkyl-aralkylperoxide.

5. A process according to claim 4 wherein said compound is dicumylperoxide.

6. A process according to claim 4 wherein 0.5 to 6% by weight of free-radical compound with respect to the polymer is used.

7. A shaped object comprising a polymer vulcanized in accordance with the process of claim 1.

8. A composition comprising a mixture of a substantially saturated polymer formed of monomers having only one vinyl double bond, with an amount of 0.1 to 15% by weight with respect to the polymer of a material selected from the group consisting of furfural and a condensation product of furfural and a source of free radicals.

9. A substance comprising a mixture of a substantially saturated polymer formed of monomers having only one vinyl double bond vulcanized with the aid of an amount of 0.1 to 15% by weight with respect to the polymer of a material selected from the group consisting of furfural and a condensation product of furfural and a source of free radicals.

10. A method in accordance with claim 1, wherein said temperature lies between 120 and 210° C.

11. A method in accordance with claim 1, wherein said heating is carried out for from 5–60 minutes.

12. A method in accordance with claim 1, wherein said saturated polymer comprises a polymer of ethylene.

13. A method in accordance with claim 2, wherein said filler is carbon black.

14. A process for the vucanization of a substantially saturated copolymer of ethylene comprising heating a mixture of said copolymer with dicumylperoxide and an amount of 0.1 to 15% by weight with respect to the polymer of a material selected from the group consisting of furfural and a condensation product of furfural at 150–170° C. for 5–60 minutes.

References Cited by the Examiner
UNITED STATES PATENTS

| 2,780,614 | 2/1957 | Harvey | 260—828 |
| 2,826,570 | 3/1958 | Ivett | 260—94.9 |
| 2,952,657 | 9/1960 | Serniuk | 260—73 |
| 3,084,141 | 4/1963 | Kraus et al. | 260—85.3 |

OTHER REFERENCES

Robinson et al.: Ethylene-Propylene Rubber Vulcanization With Aralkyl Peroxide and Coagents, in Industrial and Engineering Product Research and Development, vol. 1, No. 2, pages 78–82, June 1962.

SAMUEL H. BLECH, *Primary Examiner.*

JAMES A. SEIDLECK, *Examiner.*

E. J. TROJNAR, P. LIEBERMAN, *Assistant Examiners.*